United States Patent
Chen (10) Patent No.: US 7,116,186 B2
(45) Date of Patent: Oct. 3, 2006

(54) DUAL-BAND BANDPASS FILTER

(75) Inventor: Cheng-Chung Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 75 days.

(21) Appl. No.: 11/037,057

(22) Filed: Jan. 19, 2005

(65) Prior Publication Data
US 2006/0046682 A1    Mar. 2, 2006

(30) Foreign Application Priority Data
Sep. 1, 2004    (TW) .............................. 93126436 A (51) Int. Cl.
*H01P 5/12* (2006.01)
*H01P 1/20* (2006.01)
*H01P 3/08* (2006.01)
*H01P 7/08* (2006.01)

(52) U.S. Cl. .................. 333/126; 333/202; 333/204; 333/222; 333/24 C (58) Field of Classification Search ................ 333/126, 333/24 C, 206, 222
See application file for complete search history.

(56) References Cited

U.S. PATENT DOCUMENTS

| | | | |
|---|---|---|---|
| 5,045,824 A * | 9/1991 | Metroka ...................... | 333/206 |
| 5,191,305 A | 3/1993 | Frost et al. | |
| 5,349,316 A | 9/1994 | Sterns | |
| 5,497,130 A * | 3/1996 | Hirai et al. ................. | 333/204 |
| 5,783,978 A * | 7/1998 | Noguchi et al. ............ | 333/202 |
| 5,932,522 A * | 8/1999 | Bell et al. ................... | 505/210 |
| 6,052,040 A * | 4/2000 | Hino .......................... | 333/134 |
| 6,147,571 A | 11/2000 | Kitazawa et al. | |
| 6,246,303 B1 * | 6/2001 | Endo .......................... | 333/206 |
| 6,909,344 B1 * | 6/2005 | Toncich .................... | 333/219.2 |

FOREIGN PATENT DOCUMENTS

JP     09-232807     9/1997

OTHER PUBLICATIONS

"Concurrent Multiband Low-Noise Amplifiers-Theory, Design, and Applications." by Hossein Hashemi et al. IEEE Transactions On Microwave Theory and Techniques, vol. 50, No. 1, Jan. 2002.

"Dual-band step-impedance bandpass filter for multimode wireless LANs." by Sheng-Fuh Chang et al. Electronics Letter, vol. 40, No. 1, Jan. 2004.

(Continued)

*Primary Examiner*—Robert Pascal
*Assistant Examiner*—Kimberly E. Glenn
(74) *Attorney, Agent, or Firm*—Rabin & Berdo, P.C.

(57) ABSTRACT

A dual-band bandpass filter having a first pass band and a second pass band respectively corresponding to a first frequency and a second frequency. The filter includes a first pair of resonators, a second pair of resonators and a first coupling element. The first pair of resonators includes a first resonator and a second resonator, which share a first grounding transmission line and are grounded through the first grounding transmission line to generate coupling. The second pair of resonators includes a third resonator and a fourth resonator, which share a second grounding transmission line and are grounded through the second grounding transmission line to generate coupling. The first coupling element connected between the first and second pairs of resonators makes the first and second pairs of resonators produce coupling such that the dual-band bandpass filter has the first and second pass bands.

15 Claims, 8 Drawing Sheets

OTHER PUBLICATIONS

"A Miniaturized Monolithic Dual Band Filter Using Ceramic Lamination Technique For Dual Mode Portable Telephones." by Hideyuki Miyake et al., 1997 IEEE MTT-S Digest, WE3F-10, p. 789-p. 792.

"A Novel Coupling Structure Suitable For Cross-Coupled Filters With Folded Quarter-Wave Resonators", by Chi-Yang Chang et al., IEEE Microwave and Wireless Components Letters, vol. 13, No. 12, Dec. 2003, p. 517- p. 519.

* cited by examiner

DUAL-BAND BANDPASS FILTER

This application claims the benefit of Taiwan application Ser. No. 93126436, filed Sep. 1, 2004, the subject matter of which is incorporated herein by reference.

BACKGROUND OF THE INVENTION

1. Field of the Invention

The invention relates in general to a dual-band filter, and more particularly to a dual-band bandpass filter.

2. Description of the Related Art

Figure 1:
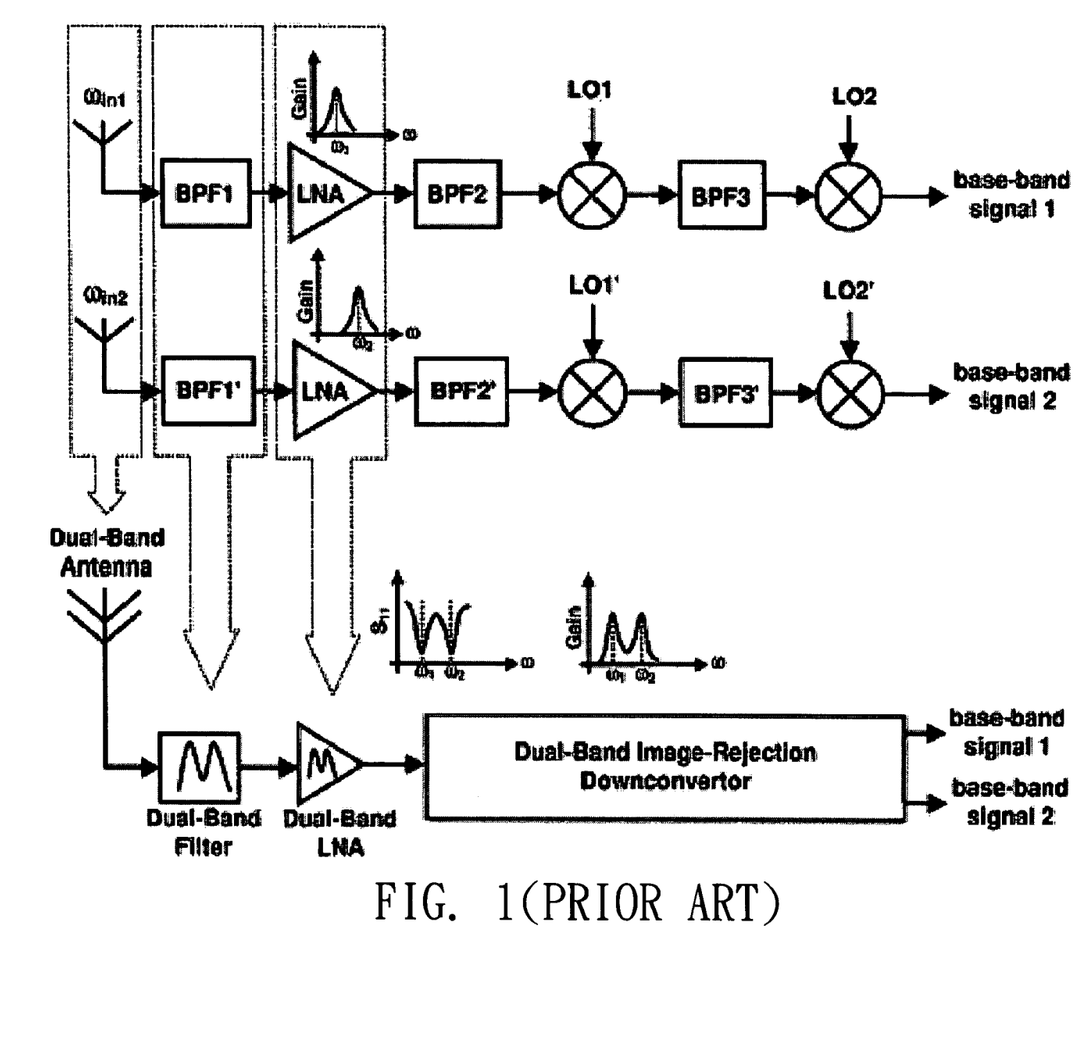
FIG. 1 shows the architecture of a concurrent dual-band receiver, which is proposed by Hossein Hashemi in "IEEE TRANSACTIONS ON MICROWAVE THEORY AND TECHNIQUES, VOL. 50, NO. 1, JANUARY 2002," and entitled "Concurrent Multiband Low-Noise Amplifiers-Theory, Design, and Applications."

The wireless local area network and mobile communication applications are growing wider and wider, and the development of the applications is advanced toward the multi-band multi-mode system. The dual-band bandpass filter is an important key component in a specific multi-band multi-mode radio frequency transceiver circuit. FIG. 1 shows the architecture of a concurrent dual-band receiver, which is proposed by Hossein Hashemi in "IEEE TRANSACTIONS ON MICROWAVE THEORY AND TECHNIQUES, VOL. 50, NO. 1, JANUARY 2002," and entitled "Concurrent Multiband Low-Noise Amplifiers-Theory, Design, and Applications."

Figure 2:
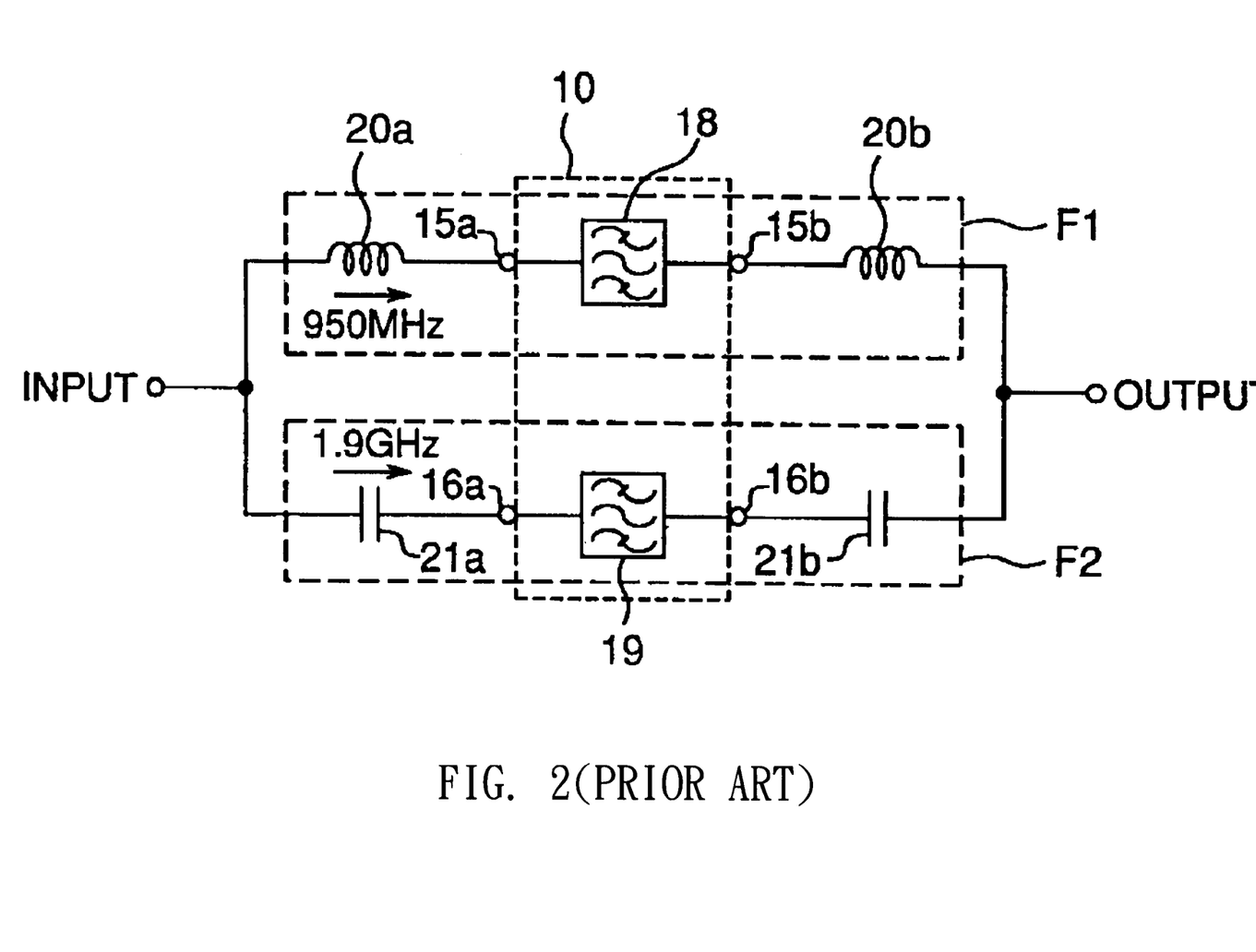
FIG. 2 is a circuit diagram showing a dual-band multilayer bandpass filter disclosed in U.S. Pat. No. 6,147,571.

FIG. 2 is a circuit diagram showing a dual-band multi-layer bandpass filter disclosed in U.S. Pat. No. 6,147,571, wherein the dual-band filter is implemented by combining two filters with different frequencies in a multilayer board structure in conjunction with a matching circuit composed of a capacitor and an inductor at input and output ends. However, the additional matching circuit required in this dual-band filter causes relative difficulty in the practical design and circuit layout stage.

Figure 3:
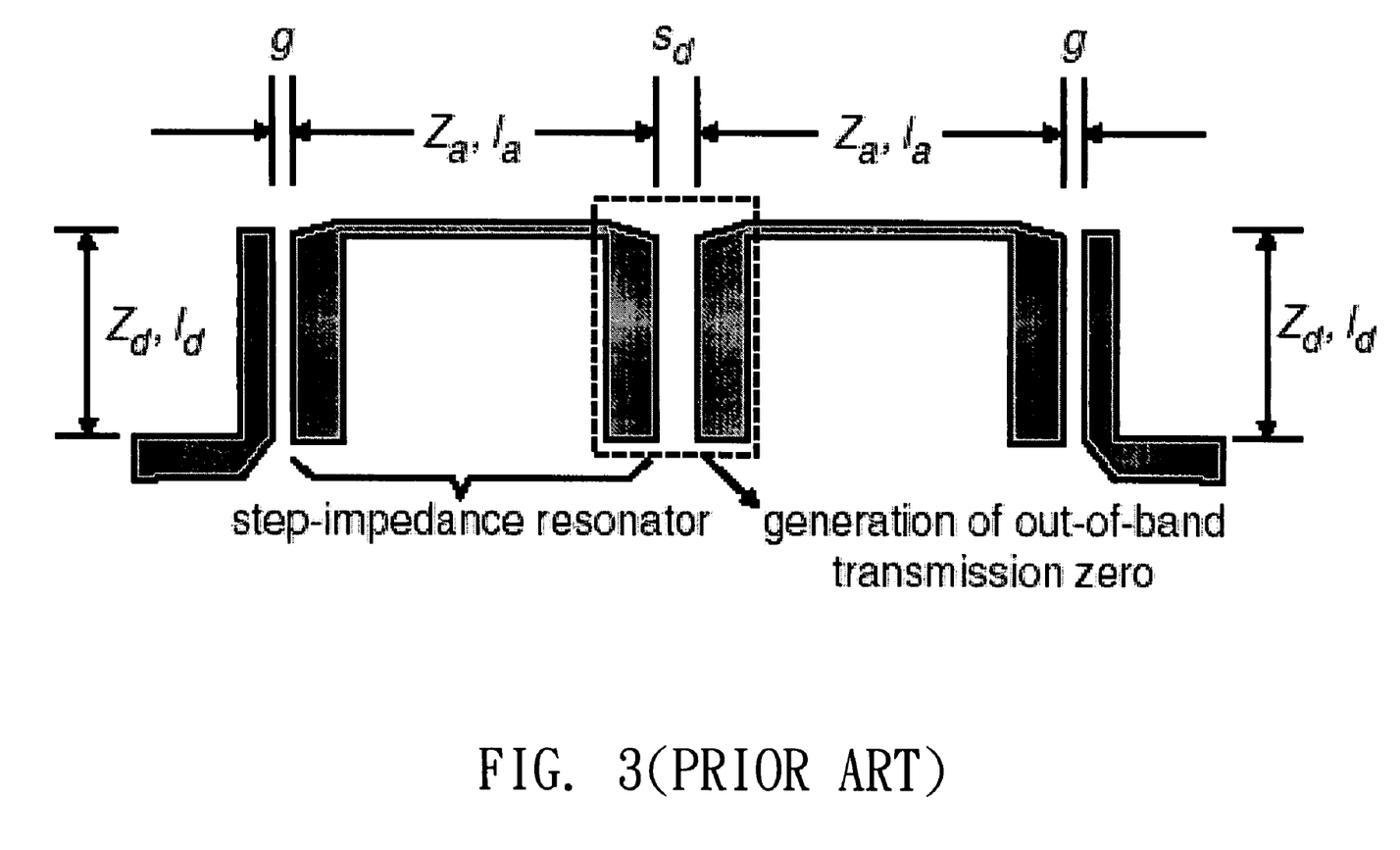
FIG. 3 is a schematic illustration showing a dual-band filter applied to a multi-mode radio system, which is proposed by Sheng-Fuh Chang in "ELECTRONICS LETTER, VOL. 41, NO. 1, JANUARY 2004," and entitled "Dual-band step-impedance bandpass filter for multimode wireless LANs."

FIG. 3 is a schematic illustration showing a dual-band filter applied to a multi-mode radio system, which is proposed by Sheng-Fuh Chang in "ELECTRONICS LETTER, VOL. 41, NO. 1, JANUARY 2004," and entitled "Dual-band step-impedance bandpass filter for multimode wireless LANs." This dual-band filter adjusts the length and impedance of a half wavelength transmission line resonator so as to obtain two pass bands. However, to flexibly control the secondary resonance mode of step impedance half wavelength resonator, the impedance ration of the resonator might meet with the limitation of circuit implementation, thereby causing difficulty in the utility stage. In addition, the dual-band filters are mostly implemented on a single layer printed circuit board. So, when the dual-band filter layout is to be performed on a multilayer board, a large area will be wasted and the specification of the general commercial components or modules cannot be satisfied.

SUMMARY OF THE INVENTION

It is therefore an object of the invention to provide a dual-band bandpass filter, which has a simple circuit layout in an extremely small area of a multilayer ceramic substrate, and can precisely produce two pass bands with two different center frequencies.

The invention achieves the above-identified object by providing a dual-band bandpass filter having a first pass band and a second pass band respectively corresponding to a first frequency and a second frequency. The dual-band bandpass filter includes a first pair of resonators, a second pair of resonators and a first coupling element. The first pair of resonators includes a first resonator and a second resonator, both of which share a first grounding transmission line. One end of the first grounding transmission line is grounded, and the first resonator and the second resonator generate coupling by the first grounding transmission line. The second pair of resonators includes a third resonator and a fourth resonator, both of which share a second grounding transmission line. One end of the second grounding transmission line is grounded, and the third resonator and the fourth resonator generate coupling by the second grounding transmission line. The first coupling element connected between the first pair of resonators and the second pair of resonators makes the first pair of resonators and the second pair of resonators generate coupling, such that the dual-band bandpass filter has the first pass band and the second pass band.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 4:
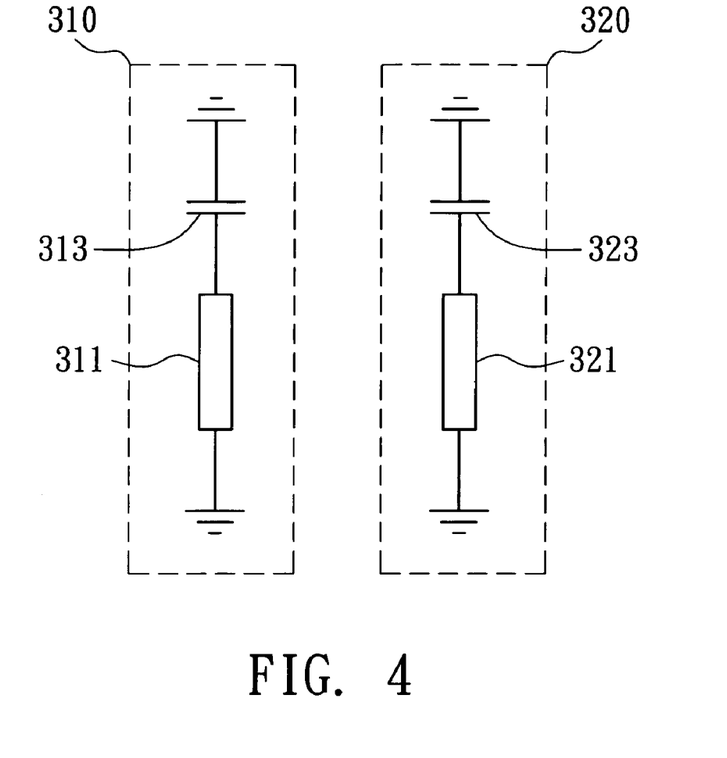
FIG. 4 shows two independent resonators.
Figure 5:
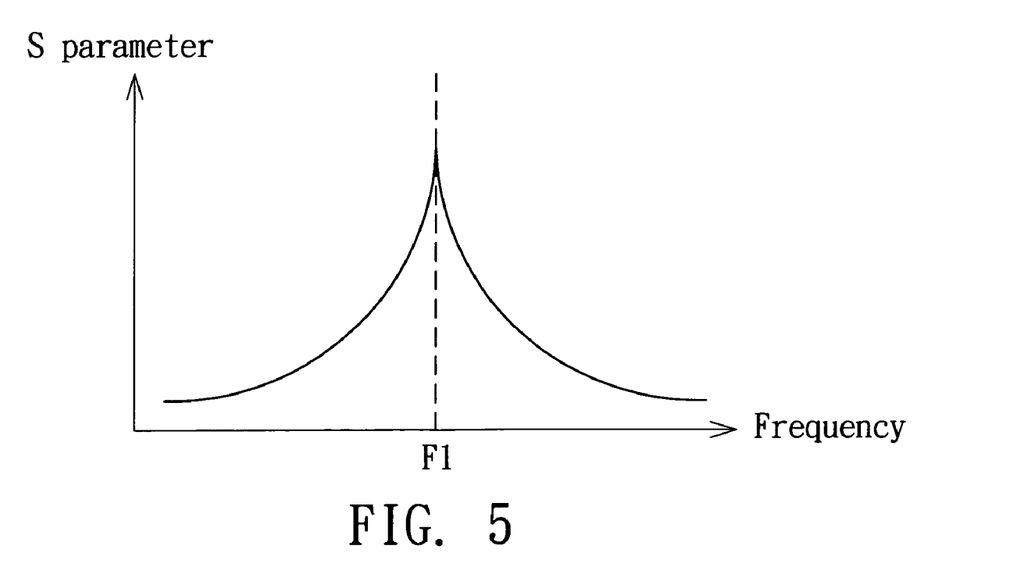
FIG. 5 is a schematic illustration showing a $S_{21}$ parameter response of a resonator.

In a typical filter, a quarter-wavelength resonator is usually used to produce the resonance mode, wherein the length L of the transmission line of the resonator is about a quarter of the electromagnetic wavelength to be transmitted, and one end of the transmission line is grounded. If the physical length of the resonator is to be reduced, a grounding capacitor connected to the transmission line in series may be provided in order to shorten the transmission line without changing the resonance frequency of the resonator. FIG. 4 shows two independent resonators. The resonator 310 includes a transmission line 311 and a capacitor 313, both of which are connected in series. One end of the capacitor 313 is grounded, and one end of the transmission line 311 is also grounded. The resonator 320 includes a transmission line 321 and a capacitor 323, both of which are connected in series. One end of the capacitor 323 is grounded, and one end of the transmission line 321 is also grounded. Each of the resonator 310 and the resonator 320 can resonate at frequency F1. The length of each of the transmission line 311 and the transmission line 321 is smaller than a quarter of the wavelength of the transmission line. FIG. 5 is a schematic illustration showing a $S_{21}$ parameter response of the resonator 310 and the resonator 320.

Figure 6:
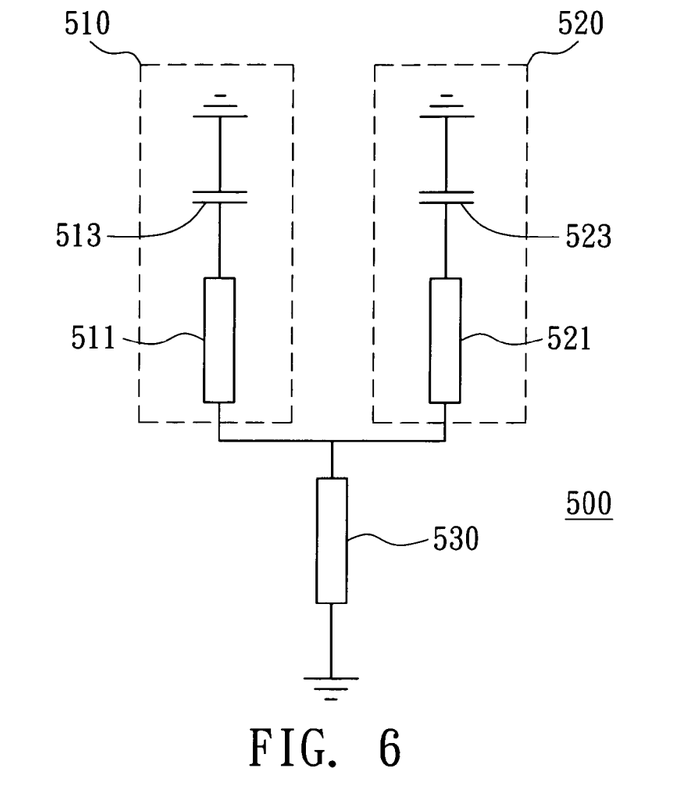
FIG. 6 is a circuit diagram showing a pair of resonators disclosed in the invention.

FIG. 6 is a circuit diagram showing a pair of resonators disclosed in the invention. The pair of resonators or resonator pair 500 includes a resonator 510, a resonator 520 and a grounding transmission line 530. The resonator 510 and the resonator 520 are coupled to each other and commonly grounded by the grounding transmission line 530. The resonator 510 includes a transmission line 511 and a capacitor 513, both of which are connected in series. One end of the capacitor 513 is grounded. The resonator 520 includes a transmission line 521 and a capacitor 523, both of which are connected in series. One end of the capacitor 523 is grounded. The transmission line 511 and the transmission line 521 are commonly connected to a grounding transmission line 530, and one end of the grounding transmission line 530 is grounded.

Figure 7:
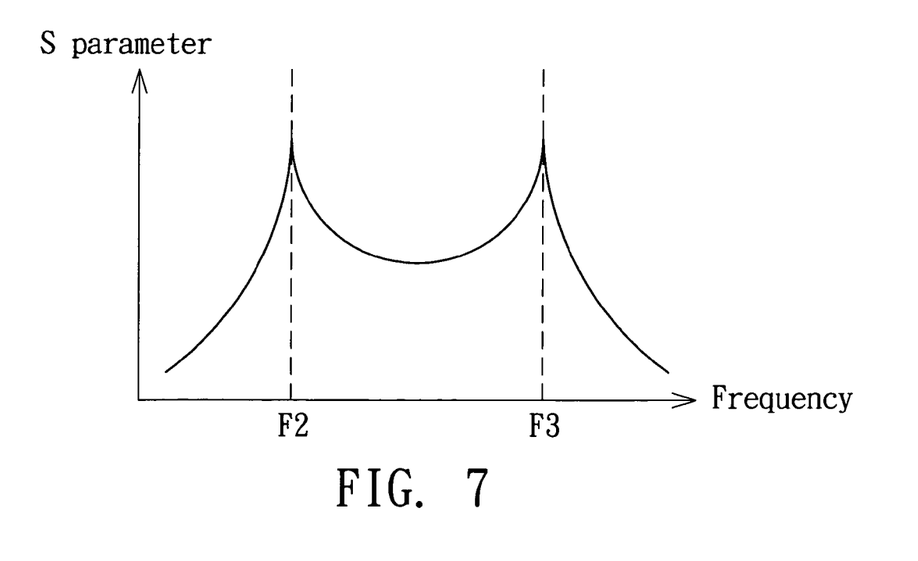
FIG. 7 is a schematic illustration showing the $S_{21}$ parameter response when the pair of resonators generates coupling.

FIG. 7 is a schematic illustration showing the $S_{21}$ parameter response when the pair of resonators generates coupling. The separation of even mode frequency F2 and odd mode frequency F3 can be adjusted to each required frequency band by changing the capacitance of each of the capacitor 513 and the capacitor 523 or the length of each of the transmission line 511, the transmission line 521 and the grounding transmission line 530.

Figure 8:
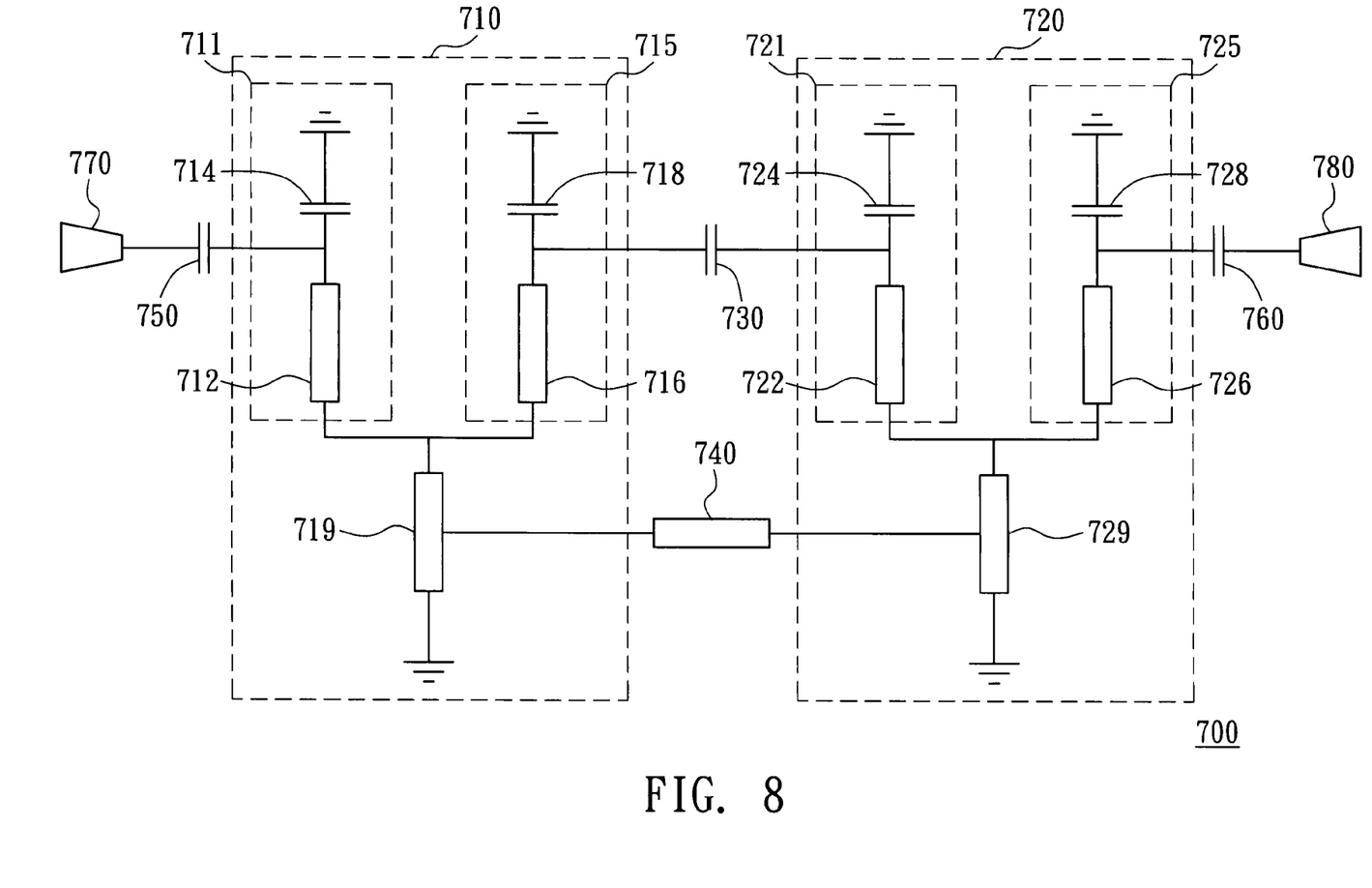
FIG. 8 is a circuit diagram showing a dual-band bandpass filter according to a preferred embodiment of the invention.

FIG. 8 is a circuit diagram showing a dual-band bandpass filter according to a preferred embodiment of the invention. The dual-band bandpass filter 700 has a pass band B1 and a pass band B2 with the frequency F2 and the frequency F3 as the center frequencies, respectively. The dual-band bandpass filter 700 includes a pair of resonators or resonator pair 710, a pair of resonators or resonator pair 720, a coupling element 730, a coupling element 740, an input capacitor 750, an output capacitor 760, an input port 770 and an output port 780.

The resonator pair 710 includes a resonator 711 and a resonator 715, both of which share a grounding transmission line 719. One end of the grounding transmission line 719 is grounded, and the resonator 711 and the resonator 715 generate coupling by the grounding transmission line 719. The resonator pair 720 includes a resonator 721 and a resonator 725, both of which share a grounding transmission line 729. One end of the grounding transmission line 729 is grounded, and the resonator 721 and the resonator 725 generate coupling by the grounding transmission line 729.

The resonator 711 includes a capacitor 714 and a transmission line 712 connected to the capacitor 714 in series, wherein one end of the capacitor 714 is grounded. The resonator 715 includes a capacitor 718 and a transmission line 716 connected to the capacitor 718 in series, wherein one end of the capacitor 718 is grounded, and the transmission line 712 and the transmission line 716 are commonly coupled to the grounding transmission line 719. The resonator 721 of the resonator pair 720 includes a capacitor 724 and a transmission line 722 connected to the capacitor 724 in series, wherein one end of the capacitor 724 is grounded. The resonator 725 includes a capacitor 728 and a transmission line 726 connected to the capacitor 728 in series, wherein one end of the capacitor 728 is grounded, and the transmission line 722 and the transmission line 726 are commonly coupled to the grounding transmission line 729.

The input capacitor 750 is coupled to the input port 770, and one end of the input capacitor 750 is coupled to a terminal between the capacitor 714 and the transmission line 712. The output capacitor 760 is coupled to the output port 780, and one end of the output capacitor 760 is coupled to a terminal between the capacitor 728 and the transmission line 726. The functions of the input capacitor 750 and the input capacitor 760 are to realize the external quality factor of the filter.

Figure 9:
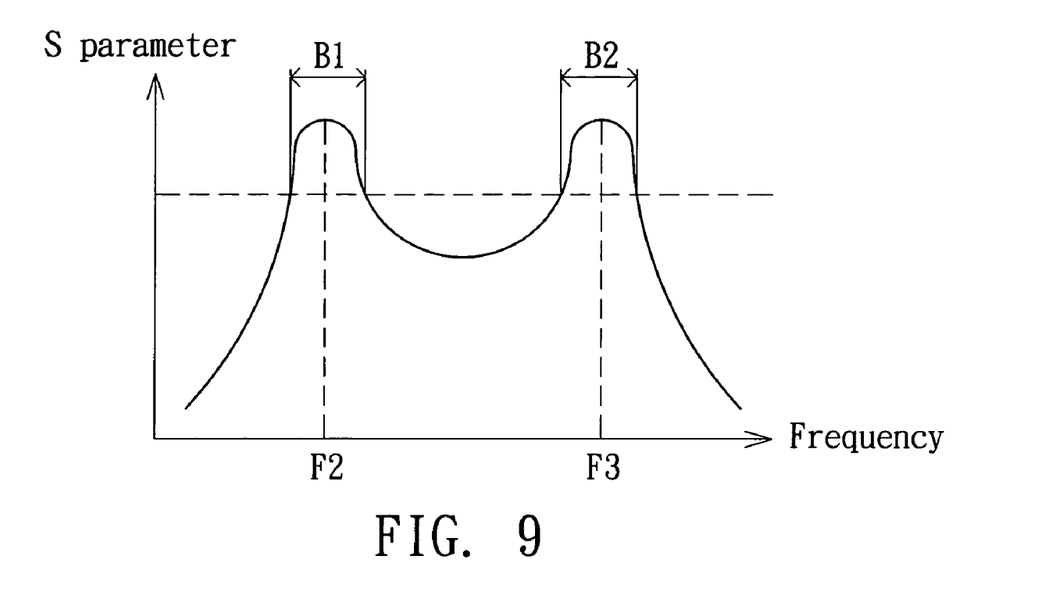
FIG. 9 is a schematic illustration showing the $S_{21}$ parameter response of the dual-band bandpass filter of the invention.
Figure 10:
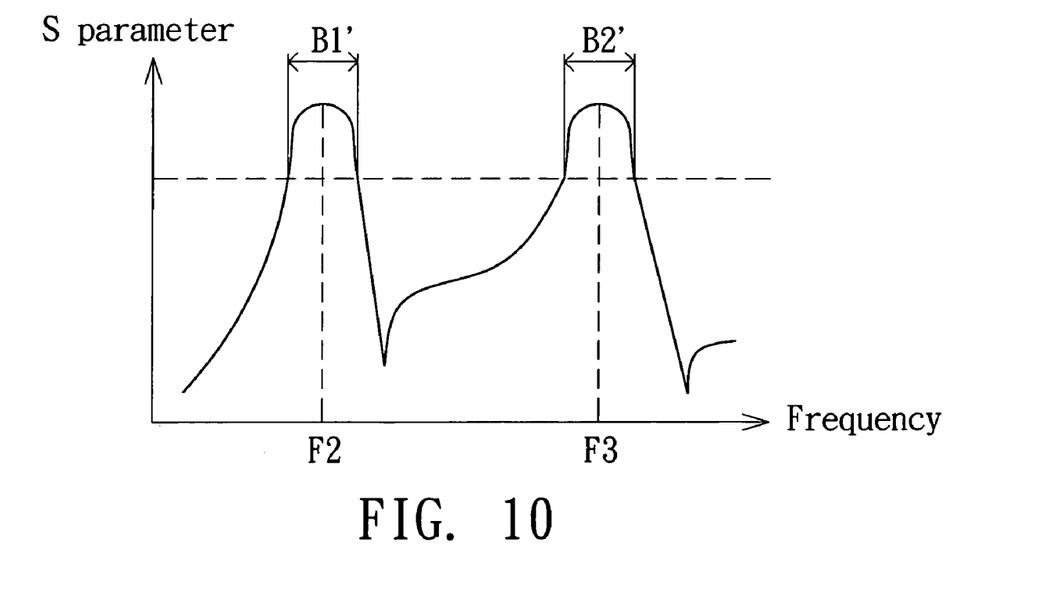
FIG. 10 is a schematic illustration showing the $S_{21}$ parameter response of the dual-band bandpass filter of the invention with the cross coupled element.

The coupling element 730 is coupled between the resonator pair 710 and the resonator pair 720 to make the resonator pair 710 and the resonator pair 720 generate coupling, such that the dual-band bandpass filter 700 has the pass band B1 and the pass band B2. In this embodiment, the coupling element 730 is a capacitive coupling element, such as a capacitor having a capacitance determined according to the bandwidth of each of the pass band B1 and the pass band B2. When the coupling element 730 is a capacitor, one end of the coupling element 730 is coupled to a connection point between the capacitor 718 and the transmission line 716, and the other end of the coupling element 730 is coupled to a connection point between the capacitor 724 and the transmission line 722. FIG. 9 is a schematic illustration showing the $S_{21}$ parameter response of the dual-band bandpass filter 700 with two pairs of resonators coupled through element 730., wherein two separated pass band B1 and the pass band B2 are produced. The coupling element 740, which is a magnetic coupling element, is a transmission line coupled between the grounding transmission line 719 and the grounding transmission line 729 in this embodiment. There is a phase difference of 180 degrees between the main coupling path of the coupling element 730 and the cross-interleaving coupling path of the coupling element 740. The coupling element 740 generates a transmission zero at a higher frequency stop band of each of the pass band B1 and the pass band B2 so as to increase the stop band attenuation and to suppress the mirror noises. FIG. 10 is a schematic illustration showing the $S_{21}$ parameter response of the dual-band bandpass filter 700 of the invention with both main coupling element 730 and cross coupled element 740. The dual-band bandpass filter 700 receives an input signal at the input port 770 and outputs an output signal from the output port 780.

In the above-mentioned dual-band bandpass filter 700, the elements in the form of the transmission line, such as the transmission line 712, the transmission line 716, the transmission line 722, the transmission line 726, the grounding transmission line 719, the grounding transmission line 729, or the coupling element 740 implemented by the transmission line may be formed in a medium substrate as a strip line or a micro-strip line. The dual-band bandpass filter 700 with the transmission lines in the form of strip lines may be implemented in a multilayer ceramic circuit board.

Figure 11:
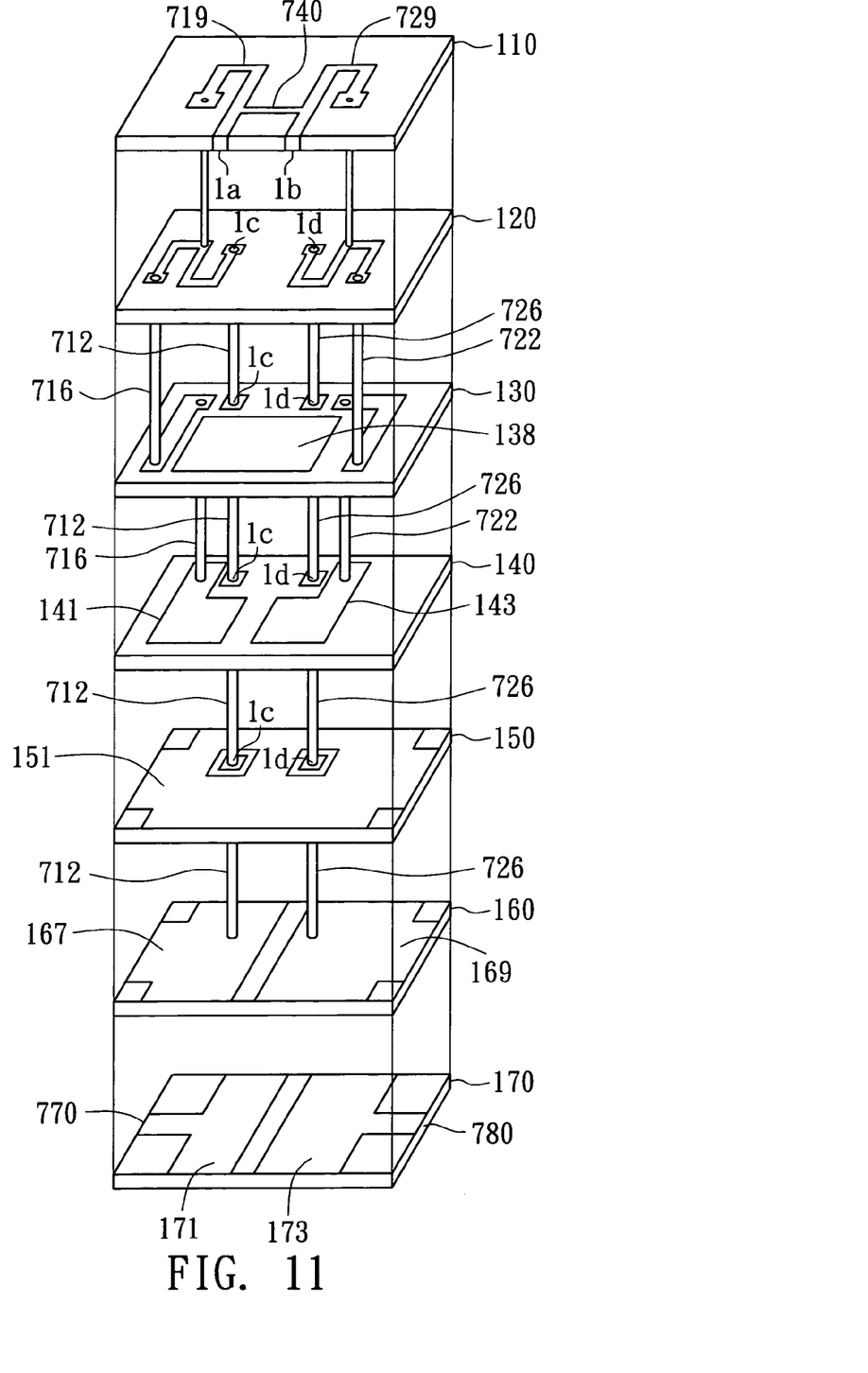
FIG. 11 is a schematic illustration showing a dual-band filter applied to a multilayer ceramic circuit according to an embodiment of the invention.

FIG. 11 is a schematic illustration showing a dual-band bandpass filter of FIG. 8 according to the preferred embodiment of the invention, which is applied to a multilayer ceramic circuit board. The multilayer ceramic circuit board for implementing the dual-band bandpass filter 100 includes medium layers 110, 120, 130, 140, 150, 160 and 170. The medium layer 110 includes the grounding transmission line 719, the grounding transmission line 729, the coupling element 740 and ends 1a and 1b. In this embodiment, the coupling element 740 is implemented in the form of the transmission line, and ends 1*a* and 1*b* are grounded.

The components between the medium layers 120 and 130 include the transmission lines 716, 712, 726 and 722. The transmission lines 712 and 726 respectively penetrate through the medium layers 130,140 and 150 at via holes 1*c* and 1*d* and are respectively connected to the medium layer 160. The transmission lines 716 and 722 are connected to the medium layer 140. The medium layer 130 includes a metal sheet 138. The medium layer 140 includes a metal sheet 141 and a metal sheet 143. A capacitor formed by the metal sheets 141 and 138 and a capacitor formed by the metal sheets 143 and 138 are connected in series to form a capacitor, which is the coupling element 730 of FIG. 8.

The medium layer 150 mainly includes a grounding metal sheet 151 that is grounded. The grounding metal sheet 151 and the metal sheet 141 form a capacitor corresponding to the capacitor 718 of FIG. 8. The grounding metal sheet 151 and the metal sheet 143 form a capacitor corresponding to the capacitor 724. The medium layer 160 includes a metal sheet 167 and a metal sheet 169. The transmission line 712 penetrates through the medium layer 130, the medium layer 140 and the medium layer 150 at via holes 1*c* and is connected to the metal sheet 167. The metal sheet 167 and the grounding metal sheet 151 form the capacitor 714 of FIG. 8. The transmission line 726 penetrates through the medium layer 130, the medium layer 140 and the medium layer 150 at via holes 1d and is then connected to the metal sheet 169. The metal sheet 169 and the grounding metal sheet 151 form a capacitor corresponding to the capacitor 728.

The medium layer 170 includes a metal sheet 171, a metal sheet 173, an input port 770 and an output port 780. A capacitor corresponding to the input capacitor 750 of FIG. 8 is formed between the metal sheet 171 and the metal sheet 167. The metal sheet 173 and the metal sheet 169 form a capacitor corresponding to the input capacitor 760. The above-mentioned multilayer ceramic substrate 100 has a designed area of 106 mils*70 mils, and a total height of 21.2 mils, wherein the thickness of each medium layer is only 1 to 3 mils.

The dual-band bandpass filter according to the embodiment of the invention can be integrated into a radio frequency module to achieve the utility object with a simple structure, a low cost, a definite effect, and a specification meeting the commercial module. So, the filter of the invention has high value in the industry applications.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual-band bandpass filter having a first pass band and a second pass band respectively corresponding to a first frequency and a second frequency, the dual-band bandpass filter comprising:
   a first pair of resonators comprising a first resonator and a second resonator, both of which share a first grounding transmission line having one end grounded, wherein the first resonator and the second resonator generate coupling by the first grounding transmission line;
   a second pair of resonators comprising a third resonator and a fourth resonator, both of which share a second grounding transmission line having one end grounded, wherein the third resonator and the fourth resonator generate coupling by the second grounding transmission line; and
   a first coupling element coupled between the first pair of resonators and the second pair of resonators to generate coupling with the first pair of resonators and the second pair of resonators such that the dual-band bandpass filter has the first pass band and the second pass band.

2. The filter according to claim 1, wherein the first coupling element is a capacitive coupling element.

3. The filter according to claim 2, wherein the capacitive coupling element is a capacitor having a capacitance determined according to a bandwidth of the first pass band and a bandwidth of the second pass band.

4. The filter according to claim 1, wherein the filter further has second coupling element, which is a magnetic coupling element.

5. The filter according to claim 4, wherein the magnetic coupling element is a transmission line, which has a first end coupled to the first grounding transmission line and a second end coupled to the second grounding transmission line, and the transmission line enables higher frequency stop bands of the first pass band and the second pass band to generate a transmission zero.

6. The filter according to claim 5, wherein the transmission line is a strip line formed in a medium substrate.

7. The filter according to claim 5, wherein the transmission line is a micro-strip line formed in a medium substrate.

8. The filter according to claim 1, wherein:
   the first resonator of the first pair of resonators comprises:
      a first capacitor; and
      a first transmission line connected to the first capacitor in series, wherein the first capacitor has one end grounded; and
   the second resonator of the first pair of resonators comprises:
      a second capacitor; and
      a second transmission line connected the second capacitor in series, wherein the second capacitor has one end grounded, the first transmission line and the second transmission line are commonly connected to the first grounding transmission line, and the grounding transmission line is the coupling element between the first resonator and the second resonator.

9. The filter according to claim 8, wherein:
   the third resonator of the second pair of resonators comprises:
      a third capacitor; and
      a third transmission line connected to the third capacitor in series, wherein the third capacitor has one end grounded; and
   the fourth resonator of the second pair of resonators comprises:
      a fourth capacitor; and
      a fourth transmission line connected to the fourth capacitor in series, wherein the fourth capacitor has one end grounded, the third transmission line and the fourth transmission line are commonly connected to the second grounding transmission line, and the grounding transmission line is the coupling element between the third resonator and the fourth resonator.

10. The filter according to claim 9, wherein the first coupling element has a first end coupled to a connection point between the second capacitor and the second transmission line, and a second end coupled to a connection point between the third capacitor and the third transmission line.

11. The filter according to claim 10, wherein each of the first transmission line, the second transmission line, the third transmission line, the fourth transmission line, the first grounding transmission line and the second grounding transmission line is a micro-strip line formed in a medium substrate.

12. The filter according to claim 10, wherein each of the first transmission line, the second transmission line, the third transmission line, the fourth transmission line, the first grounding transmission line and the second grounding transmission line is a strip line formed in a medium substrate.

13. The filter according to claim 12, wherein the dual-band bandpass filter is formed in a multilayer ceramic circuit board.

14. The filter according to claim 1, further comprising:
an input port;
an input capacitor coupled to the input port, wherein the input capacitor has one end coupled to a terminal between the first capacitor and the first transmission line;
an output port; and
an output capacitor coupled to the output port, wherein the output capacitor has one end coupled to a terminal between the fourth capacitor and the fourth transmission line.

15. The filter according to claim 1, wherein the dual-band bandpass filter is integrally formed in a radio frequency module.

* * * * *